United States Patent
Cordivari et al.

(10) Patent No.: US 11,499,754 B2
(45) Date of Patent: Nov. 15, 2022

(54) DISSIPATOR INTEGRATED INTO A COMPACT SOLAR COLLECTOR

(71) Applicant: Cordivari S.R.L., Morro d'oro (IT)

(72) Inventors: Ercole Cordivari, Morro d'oro (IT); Daniele Di Giannatale, Morro d'oro (IT)

(73) Assignee: Cordivari S.R.L., Morro d'oro (IT)

( * ) Notice: Subject to any disclaimer, the term of this patent is extended or adjusted under 35 U.S.C. 154(b) by 374 days.

(21) Appl. No.: 16/954,206

(22) PCT Filed: Dec. 21, 2018

(86) PCT No.: PCT/IT2018/050260
§ 371 (c)(1),
(2) Date: Jun. 16, 2020

(87) PCT Pub. No.: WO2019/123508
PCT Pub. Date: Jun. 27, 2019

(65) Prior Publication Data
US 2020/0393165 A1    Dec. 17, 2020

(30) Foreign Application Priority Data
Dec. 21, 2017   (IT) .................. 102017000148001

(51) Int. Cl.
*F24S 40/55*        (2018.01)
*F24S 10/40*        (2018.01)
(Continued)

(52) U.S. Cl.
CPC .............. *F24S 40/55* (2018.05); *F24S 10/20* (2018.05); *F24S 10/30* (2018.05); *F24S 10/40* (2018.05);
(Continued)

(58) Field of Classification Search
CPC .. F24S 40/55; F24S 10/20; F24S 10/30; F24S 10/40; F24S 40/58; F24S 50/40; F24S 80/453; F24S 2080/03; F24S 40/50
See application file for complete search history.

(56) References Cited

U.S. PATENT DOCUMENTS

| 4,102,325 A | 7/1978 | Cummings |
| 4,232,656 A | 11/1980 | Teagan |
| 2015/0020794 A1* | 1/2015 | Furter ............... F24S 10/25 29/890.033 |

FOREIGN PATENT DOCUMENTS

| CN | 201476316 | 5/2010 |
| CN | 101900426 | 12/2010 |

(Continued)

OTHER PUBLICATIONS

International Search Report and the Written Opinion dated Feb. 19, 2020 From the International Searching Authority Re. Application No. PCT/IT2018/050260.(11 Pages).

(Continued)

*Primary Examiner* — David J Laux

(57) ABSTRACT

The present invention relates to a solar collector (1) comprising a containment structure (6) with at least one face exposed to solar radiation, said containment structure (6) comprising a central housing recess (7) and an outer edge (8) that surrounds said central housing recess (7), inside said central recess (7) a primary conduit being arranged for the circulation of a primary heat transfer fluid, exposed to solar radiation, a secondary conduit for the circulation of a secondary fluid, and a heat exchange area between said primary and secondary conduit for the heat exchange between the primary heat transfer fluid and the secondary fluid, said solar collector (1) being characterized in that in at least one portion of said outer edge (8) of the containment structure (6) at least one dissipation conduit (9) is obtained in fluid communication with said primary conduit to dissipate the excess heat to outside said solar collector (1).

13 Claims, 3 Drawing Sheets

(51) Int. Cl.
*F24S 50/40* (2018.01)
*F24S 40/58* (2018.01)
*F24S 80/453* (2018.01)
*F24S 10/20* (2018.01)
*F24S 10/30* (2018.01)
*F24S 80/00* (2018.01)

(52) U.S. Cl.
CPC .............. *F24S 40/58* (2018.05); *F24S 50/40* (2018.05); *F24S 80/453* (2018.05); *F24S 2080/03* (2018.05)

(56) References Cited

FOREIGN PATENT DOCUMENTS

| | | |
|---|---|---|
| CN | 202630445 | 12/2012 |
| DE | 102010013673 | 10/2011 |
| EP | 2503261 | 9/2012 |
| EP | 2607815 | 6/2013 |
| EP | 2746692 | 6/2014 |
| GB | 2082757 | 3/1982 |
| WO | WO 2004/090439 | 10/2004 |
| WO | WO 2019/123508 | 6/2019 |

OTHER PUBLICATIONS

Rapporto di Ricerca e Opinione Scritta [Search Report and Written Opinion] dated Aug. 8, 2018 From the Ministero dello Sviluppo Economico, Direzione Generale Sviluppo Produttivo e Competitivita Uffico Italiano Brevetti e Marchi Re. Application No. IT201700148001. 8 Pages).

Notification of Office Action and Search Report dated May 8, 2021 From the State Intellectual Property Office of the People's Republic of China Re. Application No. 201880082702.5 and its Translation of Office Action Into English. (11 Pages).

* cited by examiner

DISSIPATOR INTEGRATED INTO A COMPACT SOLAR COLLECTOR

RELATED APPLICATIONS

This application is a National Phase of PCT Patent Application No. PCT/IT2018/050260 having International filing date of Dec. 21, 2018, which claims the benefit of priority of Italian Patent Application No. 1 0201 70001 48001 filed on Dec. 21, 2017. The contents of the above applications are all incorporated by reference as if fully set forth herein in their entirety.

FIELD AND BACKGROUND OF THE INVENTION

The present invention relates to a dissipator integrated into a compact solar collector.

More precisely, the present invention relates to an excess heat dissipation system integrated into a compact solar collector with an integrated storage tank, wherein it is the structure itself of the collector that acts as a dissipator.

As is known, when a temperature gradient is present between two fluids, a flow of energy is generated from the hotter fluid to the colder fluid.

This principle is exploited in the most widely varying applications: from terminals for indoor heating to radiators for controlling the temperatures of internal combustion engines.

Thermal solar collectors are devices that are able to collect energy conveyed by the sun's rays and transform said energy into heat. This heat will then be used to heat a primary fluid in the case of indirect radiation solar collectors, or sanitary water in the case of direct radiation solar collectors. These products, if they are not used or if they are exposed to solar radiation for a long time, may reach very high temperatures.

In the prior art, solar collectors with external storage are known, comprising a collector that is able to collect the solar energy, and a storage tank that is separate and connected to the collector for storing the fluid to be heated. Storage is thus insulated from the exterior and enables the heat to be preserved that is accumulated during the day and limits dispersion thereof to the exterior. Nevertheless, in such solar collectors, storage has dimensions that are much greater than those of the net capacity thereof for containing the heated liquid, being thus rather bulky.

Alternatively to collectors with external storage, compact solar collectors have been developed that generally have plan overall dimensions and a limited space, and contain the storage tank of the fluid to be heated, preferably sanitary water, and are characterized by optimum heat exchange efficiency. Indirect radiation compact solar collectors further comprise a storage tank for a primary fluid exposed to direct solar radiation and are able to provide heat to the fluid to be heated or secondary fluid.

Compact solar collectors have the advantage of being easy to install, because it is sufficient to connect the inlet and outlet tubes of the user.

Such compact solar collectors have the drawback of having poor energy storage capacity at night. In fact, the accumulated fluid to be heated, being exposed to direct sunlight, tends to relinquish the accumulated heat at night. Thus the daytime collecting efficiency prerogative generates the very limit of the ability to retain accumulated energy at night.

Further, known compact solar collectors include those comprising vacuum tubes acting as collector elements, inside which the conduits are arranged in which the fluid to be heated flows. The vacuum tubes enable nocturnal heat loss through the upper cover to be diminished. As is known, the best thermal insulation is a vacuum because, in the presence of a vacuum, convective heat exchange mechanisms are not triggered by the free circulation of vortices that are generated inside all the fluids because of the temperature gradients. In these collectors the collecting system is positioned inside concentric tubes that are assigned the task of insulating the collector thermally. This insulating capacity is obtained by making a chamber in which the vacuum is created. Owing to the insulating feature of this type of vacuum tube, it is consequently possible to raise the temperature of the fluid to be heated that flows in the conduits. Nevertheless, the temperature of this fluid may reach very high values and in a very short time. If overheating becomes uncontrolled, damage to the plant or components thereof could occur in addition to early deterioration of the primary fluid.

In order to dissipate the excess heat, in the known prior art, heat dissipation systems for traditional solar plants are known that consist of a fin pack, connected hydraulically to the primary circuit of the solar plant, combined with a fan that, once the command is received from a dedicated control unit, enables the excess heat to be dispersed. However, these systems, in addition to the drawback of having to add appendages to the solar plant, have the difficulty of succeeding in integrating correctly at the hydraulic and electronic level the dissipation system with the rest of the plant.

Alternatively to the aforesaid heat dissipation systems, it is possible to prevent stagnation of the collectors by using covers, like shutters, sheets or the like, that inhibit the collecting capacity thereof.

Patent document GB 2 082 757 relates to a compact solar collector that provides a condensation conduit wherein the fluid evaporates when it reaches evaporation temperature, nevertheless, this solution does not allow the temperature of the fluid to be dissipated efficiently and fast.

Patent document EP 2 503 261 A1 describes an excess heat dissipation system for a flat solar collector consisting of a finned tube positioned in the upper part of the collector and connected hydraulically to the rest of the primary circuit by a thermostatic valve. When the temperature inside the primary circuit reaches the calibration level of the thermostatic valve (thus a high temperature), this enables the heat transfer liquid to move inside the dissipator. As we are in the presence of natural circulation, the flow speed, and thus the heat exchange, will be limited.

Patent document GB 2514098 A describes a dissipation circuit that also exploits the principle of natural convection. When the circulator of the solar plant is in operation, the presence of a non-return valve in the dissipation circuit enables the dissipator to be overridden owing to the pressure downstream of the valve. When the circulator is switched off, and the conditions exist for collector stagnation, the pressure gradient that is generated because of the different density of the fluid enables the valve to be opened with consequent circulation inside the dissipation circuit.

The system will have difficulty in operating for two reasons:

because of the low value of the pressure difference $\Delta P$ between the outer ambient pressure and the pressure in the conduit in which the primary heat transfer fluid flows, the fluid speed might not allow the non-return valve to open and/or might not ensure an appropriate heat exchange;

the shape of the circuit, in particular of the portion in which the fluid exits the harp absorber to enter the exchanger, hinders natural circulation because the hot fluid is forced downwards.

Also patent document U.S. Pat. No. 4,102,325 A describes a solar collector comprising an outer dissipation conduit in fluid communication with a conduit wherein a heat transfer fluid flows. As the fluid flows inside the dissipation conduit through natural circulation, it will flow at a rather reduced speed, slowly dissipating the heat.

Further, in this type of system, the aforesaid fluid transit speed is a function of floating forces, which are in turn a function of two variables: ΔT between hot fluid (entering the dissipation circuit) and (exiting) cold fluid; and tilt of the collector (as the installation angle decreases the floating forces reduce and consequently the fluid speed decreases inside the conduits). Further, using a pressure calibrating valve introduces localized load losses, which, considering the low speeds at play, could compromise the operation of the entire system.

From these considerations, a parabolic pattern of the power dissipated by this type of system follows; as these two parameters decrease, in particular fluid speed, the power that the system succeeds in exchanging undergoes a collapse.

SUMMARY OF THE INVENTION

The aim of the present invention is to overcome the problems of the prior art devices, by developing a dissipation system for excess heat for a solar collector that enables the reduced overall dimensions of the solar collector to be maintained.

A further aim is that of having an efficient dissipation system, which is able to ensure optimum dissipation capacity, in a short time.

A still further aim is to ensure a dissipation system for a compact solar collector that avoids possible problems linked to the pressure of the primary heat transfer fluid.

The object of the present invention is a compact solar collector comprising a containment structure with at least one face exposed to solar radiation, said containment structure comprising a central housing recess and an outer frame that surrounds and laterally envelops said central housing recess, inside said central recess there being arranged a primary storage conduit for storing and circulating a primary heat transfer fluid exposed to solar radiation, a secondary storage conduit for circulating and storing a secondary fluid, and a heat exchange area between said primary and secondary conduit for the heat exchange between the primary heat transfer fluid and the secondary fluid, said solar collector being characterized in that it comprises a plurality of vacuum collector tubes arranged inside said central recess, wherein each vacuum tube provides a portion of said primary conduit that surrounds a respective portion of said secondary conduit exchanging heat between themselves, in that in at least one portion of said outer frame of the containment structure at least one dissipation conduit in fluid communication with said primary conduit is obtained for the circulation of said primary heat transfer fluid to dissipate the excess heat to the outside with respect to said solar collector, and in that it further provides a circulator in fluid communication between the primary conduit and the at least one dissipation conduit, said circulator being suitable for starting motion in the primary heat transfer fluid when the temperature of the primary heat transfer fluid exceeds a preset first value, to enable the primary heat transfer fluid to flow and transit inside the at least one dissipation conduit at a higher speed in order to reduce the temperature of the primary heat transfer fluid to return subsequently to the primary conduit.

More in particular, according to the invention, said at least one portion of said frame can be obtained from a profile, in a thermally conductive material, like for example aluminium, which may have an outer perimeter and a central conduit, which coincides with said dissipation conduit, connected in turn to the outer perimeter by connecting radial fins that act as fins for transferring heat outside the solar collector.

Still according to the invention, said solar collector can further provide a thermostat, connected to said circulator and said primary conduit, said thermostat being able to measure the temperature of the primary heat transfer fluid inside said primary conduit and is able to act on said circulator so that during use, if the temperature of the primary heat transfer fluid exceeds a preset first value said circulator is activated to facilitate the circulation of the primary heat transfer fluid also in the at least one dissipation conduit, and if the temperature of the primary conduit falls or is below a preset second temperature value said circulator is switched off or remains switched off.

Preferably according to the invention, said first temperature value can vary between 95° C. and 85° C. and/or said second temperature value can vary between 80° C. and 70° C.

Further, according to the invention, said solar collector can further provide a non-return and safety valve, arranged in fluid connection with said circulator and said primary conduit apt to expel a quantity of primary heat transfer fluid to enable the primary conduit to regulate itself and in which, during use, if the pressure of the primary conduit exceeds a calibration pressure value said safety valve expels a quantity of fluid until the pressure of the primary conduit stabilizes below this value.

Still according to the invention, said solar collector can further provide a vacuum breaker valve in combination with said safety valve apt to make a quantity of air enter the primary conduit as a function of the pressure difference between the pressure in the environment outside said collector and the pressure in the primary conduit, and in which, during use, if the vacuum breaker valve detects a pressure difference, said vacuum breaker valve enables a quantity of air to enter the primary conduit until this pressure difference is cancelled.

Further, according to the invention, said portion of primary conduit can be a primary storage element for containing the primary heat transfer fluid apt to store thermal energy and each vacuum tube can have a collector tube, in particular made of glass, which envelops said primary storage element, and which is arranged coaxially therewith, forming an insulating air gap.

Always according to the invention, said secondary conduit may have a plurality of sections connected together in series to form a coil, wherein the sections can be arranged in pairs inside said storage elements, forming a heat exchange area between the primary heat transfer fluid and the secondary fluid, said sections preferably being able to be connected together so as to enter and exit said storage elements from a sole side of the solar collector.

Further, according to the invention, the storage elements of the primary heat transfer fluid can be connected together by suitable lateral connectors that connect them two by two, forming said primary conduit, being preferably connected at a sole side of the solar collector.

Further, according to the invention, the diameter of the dissipation conduit 9 can be comprised between 10 mm and 20 mm, preferably 15 mm.

Still according to the invention, the circulator can be configured so as to make the primary heat transfer fluid flow in the dissipation conduit at a speed comprised between 0.5 m/s and 1 m/s, preferably 0.8 m/s.

Lastly, according to the invention, the heat exchange between the primary heat transfer fluid and the secondary fluid can occur through natural circulation.

According to one aspect of the present invention a solar collector is provided comprising a containment structure with at least one face exposed to solar radiation, said containment structure comprising a central housing recess and an outer edge that surrounds said central housing recess, inside said central recess there being arranged a primary conduit for the circulation of a primary heat transfer fluid, exposed to solar radiation, a secondary conduit for the circulation of a secondary fluid, and a heat exchange area between said primary and secondary conduit for the heat exchange between the primary heat transfer fluid and the secondary fluid, said solar collector being characterized in that in at least one portion of said outer edge of the containment structure at least one dissipation conduit in fluid communication with said primary conduit is obtained to dissipate the excess heat to the outside with respect to said solar collector.

In particular, according to a further aspect according to the invention, the outer edge can be a frame that laterally envelops the central housing recess.

More in particular, according to a further aspect according to the invention, said at least one portion of said frame can be obtained from a profile, made of a thermally conductive material, like for example aluminium, which may have an outer perimeter and a central conduit, which coincides with said dissipation conduit, connected in turn to the outer perimeter by connecting radial fins that act as fins for transferring heat to outside the solar collector.

Still according to a further aspect according to the invention, said collector can further provide a circulator in fluid communication between the primary conduit and the at least one dissipation conduit, said circulator being apt to make the primary heat transfer fluid move to enable the primary heat transfer fluid to transit inside the at least one dissipation conduit in order to reduce the temperature of the system.

Always according to a further aspect according to the invention, said solar collector can further provide a thermostat, connected to said circulator and said primary conduit, said thermostat being able to measure the temperature of the primary heat transfer fluid inside said primary conduit and is able to act on said circulator so that during use, if the temperature of the primary heat transfer fluid exceeds a preset first value said circulator is activated to facilitate the circulation of the primary heat transfer fluid also in the at least one dissipation conduit, and if the temperature of the primary conduit falls or is below a preset second temperature value said circulator is switched off or remains switched off.

Preferably, according to a further aspect according to the invention, said first temperature value can vary between 95° C. and 85° C. and/or said second temperature value can vary between 80° C. and 70° C.

Further, according to a further aspect according to the invention, said solar collector can further provide a non-return and safety valve, arranged in fluid connection with said circulator and said primary conduit apt to expel a quantity of primary heat transfer fluid to enable the primary conduit to regulate itself and in which, during use, if the pressure of the primary conduit exceeds a calibration pressure value, said safety valve expels a quantity of fluid until the pressure of the primary conduit stabilizes below this value.

Still according to a further aspect according to the invention, said solar collector can further provide a vacuum breaker valve in combination with said safety valve apt to make a quantity of air enter the primary conduit as a function of the pressure difference between the pressure in the environment outside said collector and the pressure in the primary conduit, and in which, during use, if the vacuum breaker valve detects a pressure difference, said vacuum breaker valve enables a quantity of air to enter the primary conduit until this pressure difference is cancelled.

Further, according to a further aspect according to the invention, said solar collector can comprise a plurality of collector elements, in particular vacuum tubes, wherein each vacuum tube can have a primary storage element for containing the primary heat transfer fluid apt to store thermal energy and a collector tube, in particular made of glass, which envelops said primary storage element, and which is arranged coaxially therewith, forming an insulating air gap.

Always according to a further aspect according to the invention, said secondary conduit may have a plurality of sections connected together in series to form a coil, wherein the sections can be arranged in pairs inside said storage elements, forming a heat exchange area between the primary heat transfer fluid and the secondary fluid, said sections preferably being able to be connected together so as to enter and exit said storage elements from a sole side of the solar collector.

Lastly, according to a further aspect of the invention, the storage elements of the primary heat transfer fluid can be connected together by suitable lateral connectors that connect them two by two, forming said primary conduit, being preferably connected at a sole side of the solar collector.

BRIEF DESCRIPTION OF THE SEVERAL VIEWS OF THE DRAWINGS

The invention will now be described, by way of non-limiting illustration, with particular reference to the drawings of the appended figures, in which.

DESCRIPTION OF SPECIFICATION EMBODIMENTS OF THE INVENTION

Figure 1:
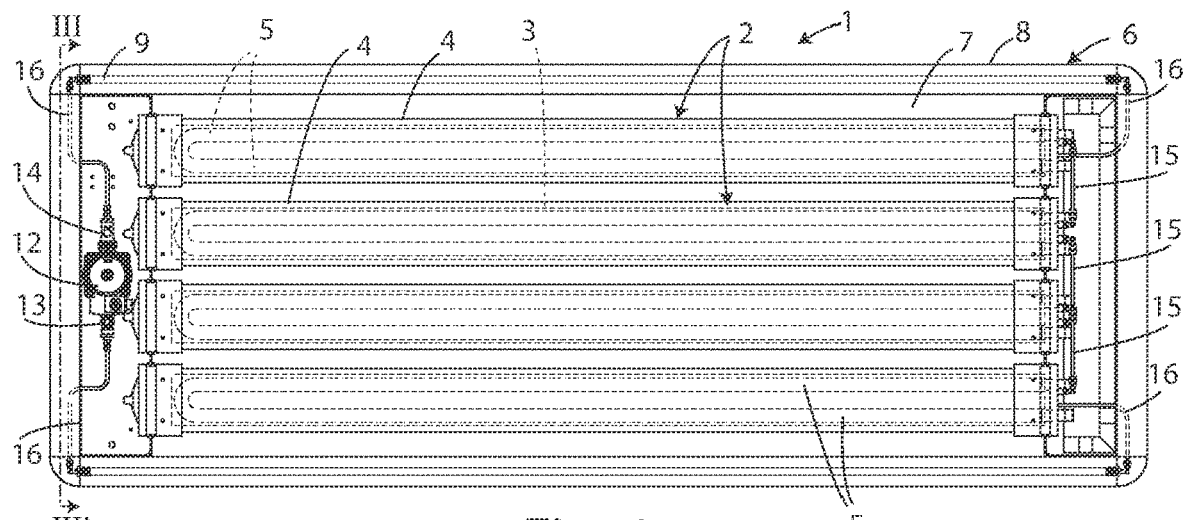
FIG. 1 is a top view of the solar collector according to the invention in a preferred embodiment.
Figure 2:
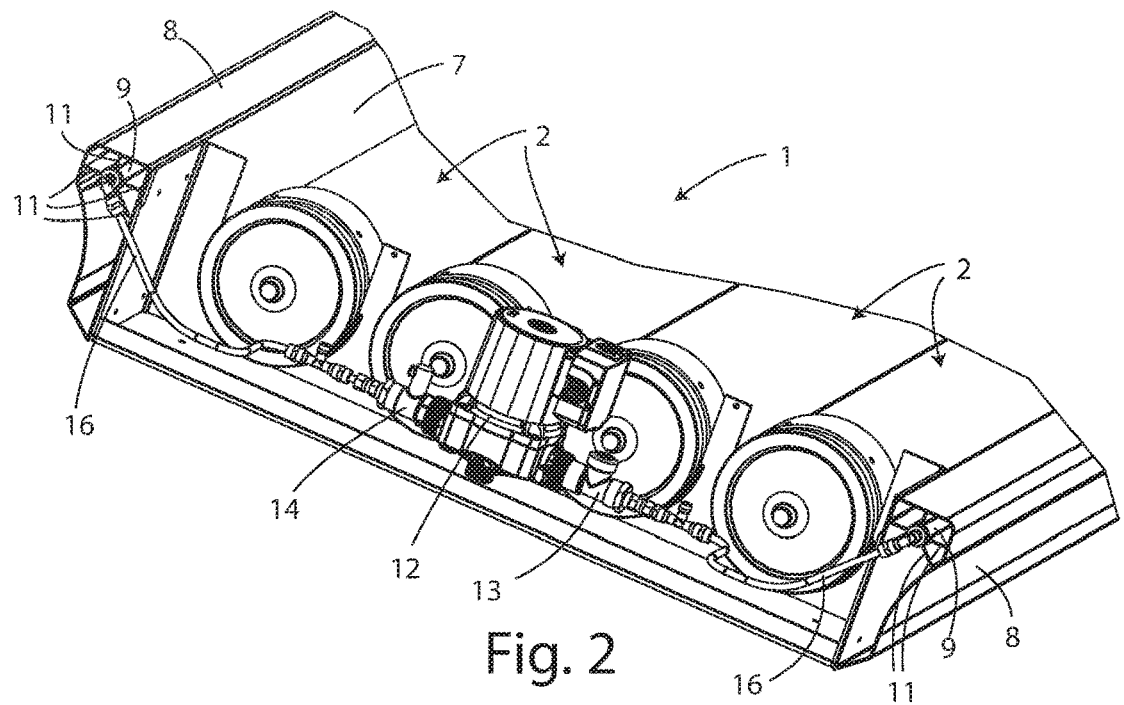
FIG. 2 is a broken perspective view of the solar collector of FIG. 1.
Figure 3:
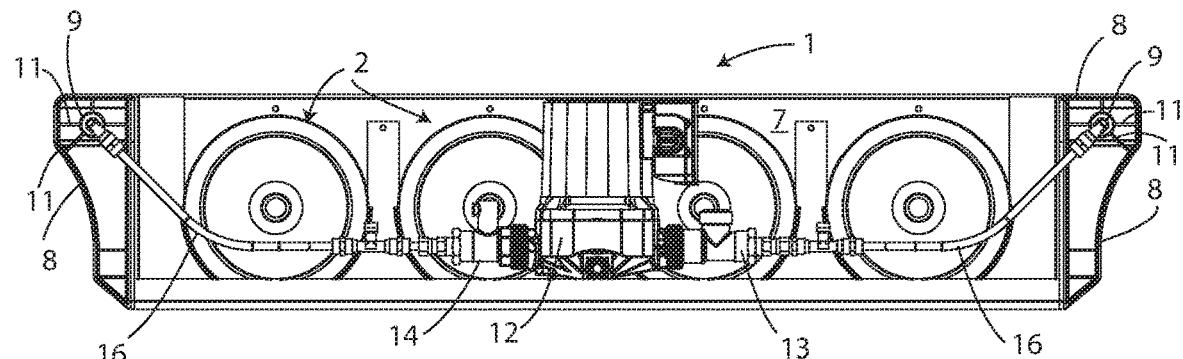
FIG. 3 is a lateral section view of the solar collector in FIG. 1 along the section line III-III'.

Making reference to FIGS. 1-3, the solar collector according to the invention is observed in a preferred embodiment, indicated by the numeric reference 1.

In the figures, there is shown a particular type of solar collector of compact type with indirect radiation comprising vacuum tubes acting as collector elements. It is clear that the present invention can be applied also to other types of solar collectors, without making significant modifications. In particular, the heat exchange between the primary heat transfer fluid and the secondary fluid occurs through natural circulation.

The solar collector 1 comprises a containment structure 6 with at least one face exposed to solar radiation, said containment structure 6 has a central housing recess 7 and an outer edge 8 that surrounds said central housing recess 7. Inside said central recess 7 there are arranged a primary conduit for the circulation of the primary heat transfer fluid, exposed to solar radiation, a secondary conduit for the circulation of the secondary fluid, for example hot sanitary water or HSW, and a heat exchange area between said primary and secondary conduit for the heat exchange between the primary heat transfer fluid and the secondary fluid.

The solar collector 1 further comprises a hydraulic circuit, obtained in the same containment structure 6 as said solar collector 1, to which the task is assigned of dissipating to the external environment the excess energy accumulated by the primary conduit.

In particular, in at least one portion of said outer edge 8 of the containment structure 6 at least one dissipation conduit 9 is obtained that is in fluid communication with said primary conduit. In the preferred embodiment, the outer edge is a frame 8 that laterally envelops the central housing recess 7. Preferably, this frame 8 is obtained from extruded profiles, in a thermally conductive material, like for example aluminium, which have, in a section like the one shown in FIG. 4, an outer perimeter 10 and a central conduit 9, which coincides with the dissipation conduit 9, connected in turn to the outer perimeter 10 by connecting radial fins 11 that also act as heat transfer fins.

Figure 4:
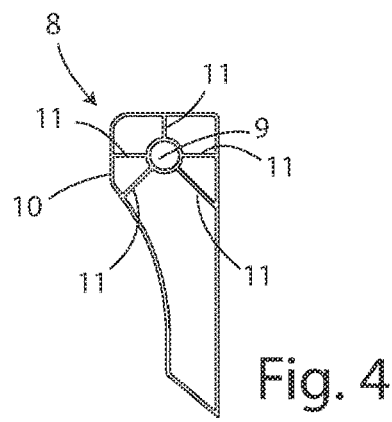
FIG. 4 is a section view of the profile that forms the side frame of the solar collector of FIG. 1.

In the profile 8 of FIG. 4 there are five radial fins 11 for the transfer of heat, in other embodiments a different number can be provided according to thermal and structural needs.

The designed and described system enables overtemperatures and the problems linked thereto to be avoided without having to add appendages to the compact solar collector, dissipating the excess heat through the structure of the panel. To do so, the conduits or dissipation conduits 9 are exploited in which the overheated primary fluid is made to transit. Owing to the radial fins, obtained inside the profiles 8, the excess heat is allowed to be dissipated to the external environment. The transfer of heat from the conduit in which the primary fluid flows and the outer surface of the profile is facilitated by the excellent heat conductivity of the aluminium.

In this manner the heat dissipation system is totally invisible and integrated inside the solar collector, without having to add external components like stand-alone dissipation units; the overall plan dimensions of the collector remain accordingly unchanged.

Figure 6:
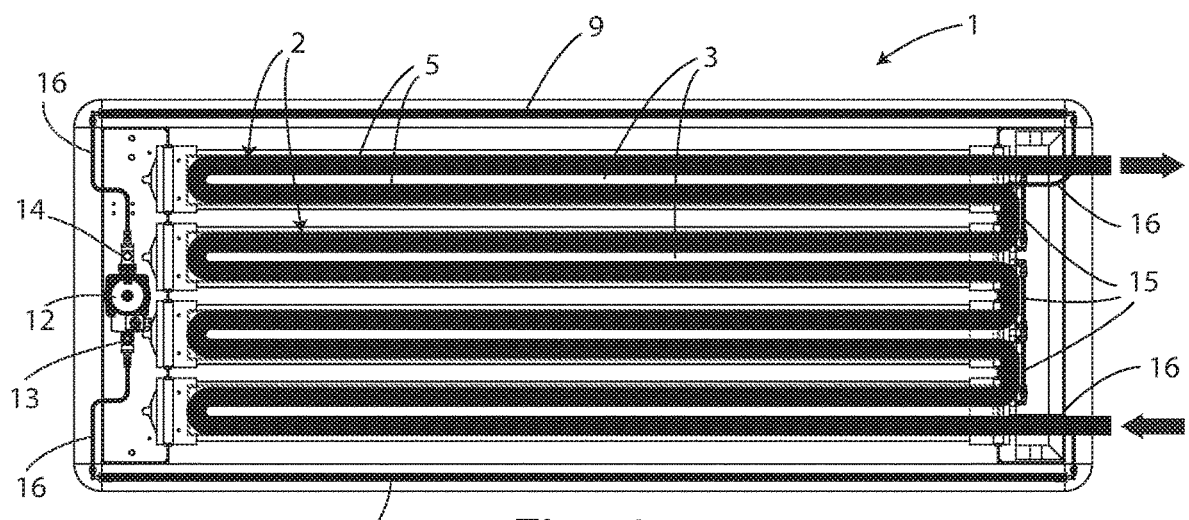
FIG. 6 is a top view of the collector of FIG. 1, wherein the primary conduit and the hot sanitary water or secondary conduit are shown, and the flow of the primary fluid inside the dissipation conduit, when the circulator is operating.

The solar collector 1 according to the invention moreover has a circulator 12 in fluid connection between the primary conduit and the at least one dissipation conduit 9. The circulator 12 has the task of making the primary heat transfer fluid move to enable the primary heat transfer fluid to transit inside the heat dissipation conduit 9 in order to reduce the temperature of the system (as shown in FIG. 6). In particular, the dissipation conduit 9 is connected to the primary conduit in such a manner that when the temperature of the primary heat transfer fluid exceeds a preset first value T1, the circulator 12 makes the heat transfer fluid move in order to flow and transit inside the at least one dissipation conduit 9 at a higher speed in order to reduce the temperature of the primary heat transfer fluid to be returned subsequently to the primary conduit.

The circulator 12 advantageously allows the flow speed of the primary heat transfer fluid in the dissipation conduit to be increased, thus reducing the excess heat dissipation time, and thus the temperature of the primary heat transfer fluid.

Considering the flow speeds of the primary heat transfer fluid in prior art natural circulation systems, which are approximately values in the order of 0.02-0.05 m/s, using the solar collector according to the invention, an increase is obtained in the flow speed of the primary heat transfer fluid that is 20 to 40 higher.

In particular, this speed is a function of the transit diameter of the fluid, in particular of the diameter of the dissipation conduit 9. As the solar collector 1 according to the invention is a solar collector of compact type, or the storage of the secondary fluid and of the primary fluid are both inside the same containment structure, the dissipation conduit 9 was advantageously inserted into the frame 8 of the collector 1 and thus has dimensional limits that are such that the diameter of the section of the dissipation conduit 9 is preferably comprised between 10 mm and 20 mm. On the basis of these dimensional parameters, the circulator 12 will have a flowrate that is such as to make the primary heat transfer fluid flow in the dissipation conduit 9 and the fluid speeds can vary between 0.5 m/s and 1 m/s. Advantageously, owing to the use of the circulator 12, by varying the aforesaid diameters a ratio between the fluid speed in the system devised according to the invention and the fluid speed in a natural circulation system can be maintained that is 10 to 50 times greater.

Figure 7:
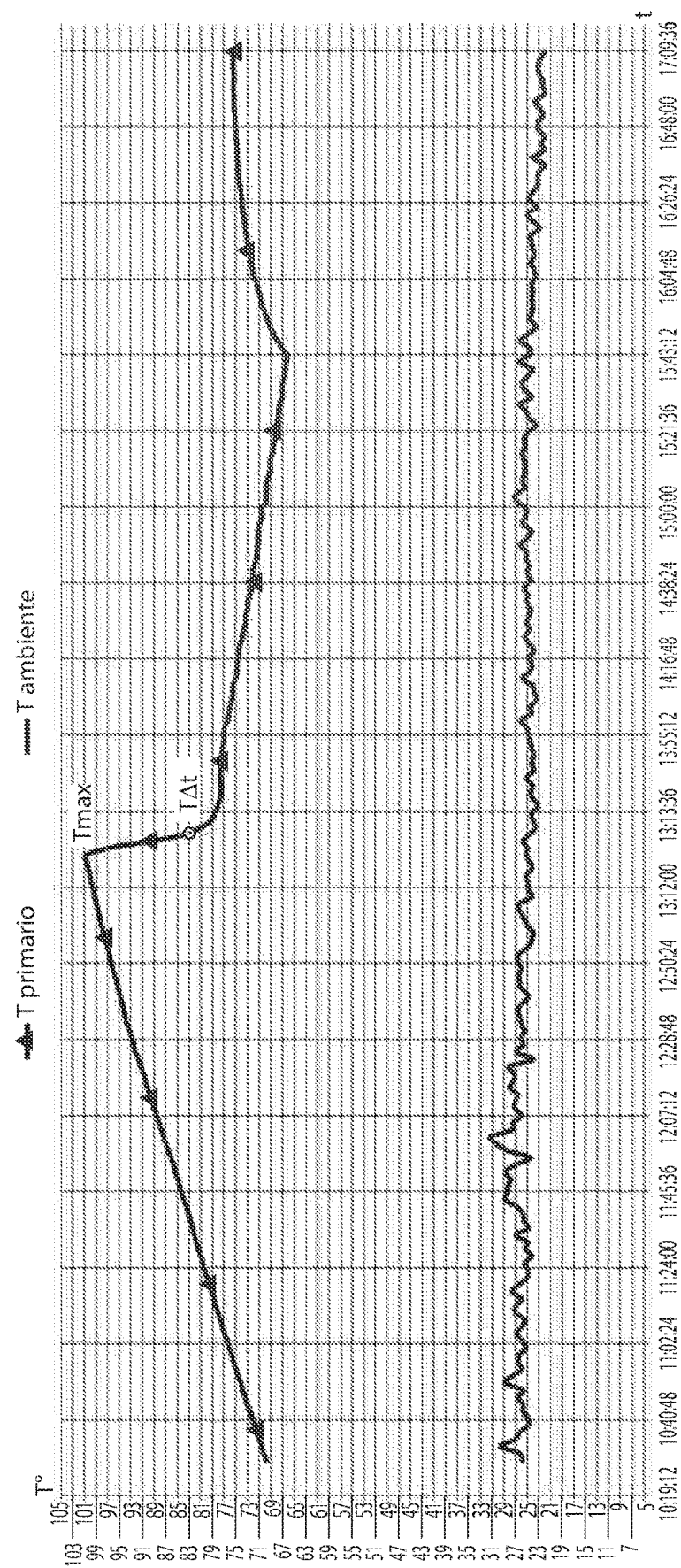
FIG. 7 is a graph in which the performance of the solar collector with the dissipation conduit according to the invention is shown, in particular it is shown how the temperature (measured in ° C.) of the primary heat transfer fluid varies in a time space during the temperature variations (measured in ° C.) of the external environment.

For example, from field tests conducted and shown in the graph of FIG. 7, it is shown that 8 minutes suffice to reduce the temperature of the primary heat transfer fluid by 20° C. In particular, this 20° C. temperature variation falls within the range shown in the figure between the maximum temperature T° max and the temperature value TΔt after a period of time Δt of 8 minutes.

In the example in FIG. 7 the activation value T1 of the circulator is the equivalent of Tmax, which is the equivalent of about 100° C.

The test was conducted on a summer day in Central Italy and, as can be seen from the X axis of the graph in which the time of day is shown, in conditions of maximum sunlight. As a result, the power that the system is able to dissipate is much greater than the power that it receives in the form of radiation, about 1300 Watt. The tilt of the collector during the test was equal to 30°, the conduit for dissipating the heat had a section that was 15 mm in diameter, considering a circulator flowrate of 500 l/hour, the fluid speed can be considered to be equal to 0.8 m/s.

Preferably, the circulator 12 can be activated by a thermostat (not shown) that, when a first preset temperature value T1 of the primary conduit is reached, allows the primary circuit to be switched on. Said first temperature value T1 can vary between 95° C. and 85° C. For other applications it can be higher or lower.

Figure 5:
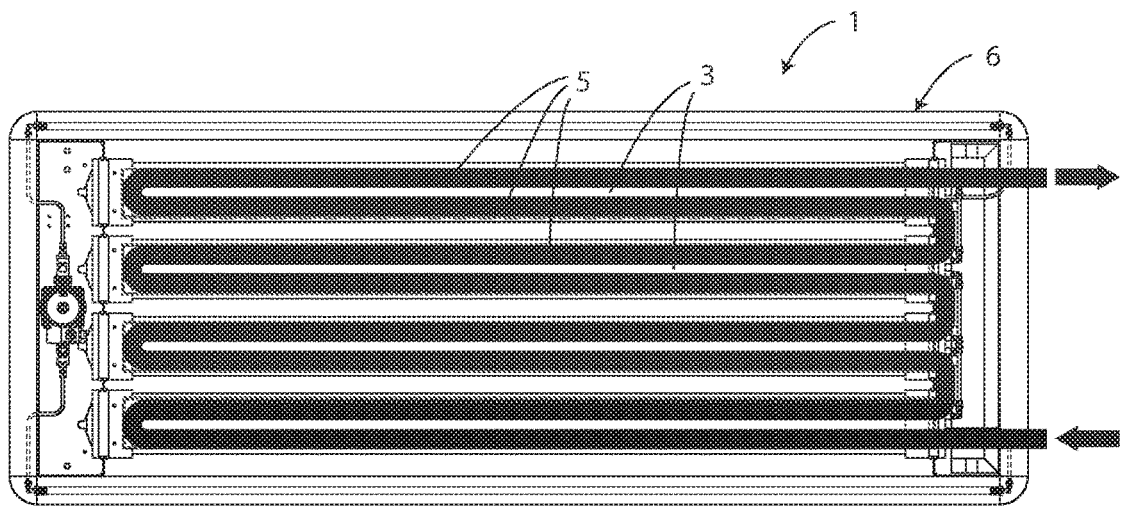
FIG. 5 is a top view of the solar collector of FIG. 1, wherein the primary conduit and the hot sanitary water or secondary conduit are shown when the circulator is not operating.

Further, said thermostat commands switching off of the circulator 12 once the temperature of the primary conduit falls below a preset second temperature value T2. In this case the primary heat transfer fluid does not circulate in the dissipation conduits 9, as shown in FIG. 5.

For the embodiment shown in the figure said second temperature value T2 can vary between 80° C. and 70° C. For other applications it can be higher or lower.

The presence of the circulator enables considerable flow speeds to be obtained. The result is a high heat exchange coefficient and thus optimum dissipation capacity. In other words said circulator enables flow speeds to be obtained for which the convective coefficient, and thus the heat exchange, is high.

Further, according to the invention, the solar collector 1 according to the invention can have a non-return and safety valve 14 combined with a vacuum breaker valve 13, arranged in fluid connection with said circulator 12, which enables the primary conduit to regulate itself. In fact, if the pressure of the primary conduit exceeds the calibration pressure P1 of the safety valve 14, the latter will expel a certain quantity of primary fluid until the pressure of the primary conduit stabilizes. The calibration pressure value P1 is dictated not only by the maximum pressure to which it is desired to subject the entire primary circuit, but also by the maximum pressure defined by the manufacturers of the individual components.

In other words, the safety valve 14 advantageously allows the primary circuit to be protected against overpressure and, at the same time, prevents a flow reversal and possible parasitic circulation.

Following cooling of the collector 1, owing for example to removal of energy by the user, the pressure of the primary conduit may fall and could adopt a value below atmospheric pressure. The pressure difference ΔP that is created between the pressure in the external environment and the pressure in the primary storage conduits could lead to the implosion of the conduits, but owing to the presence of the vacuum breaker valve 13, this effect will be avoided. In fact, the aforesaid valve 13, which is sensitive to small pressure variations ΔP, for example between 0.05 bar and 0.15 bar, will enable a quantity of air to enter that is such as to stabilize the pressure of the primary conduit until the pressure difference ΔP between the outside environment and the primary circuit is cancelled.

The presence of the vacuum breaker valve advantageously allows the generation of vacuums to be prevented following the driving of the safety valve and the cooling of the system that may lead to the implosion of the primary storage conduits.

In the case of solar collectors having tubing of large diameter, it is good practice to use the two valves 13 and 14 in combination. In the case of circuits wherein the tubes have relatively small diameters, for example in standard or non-compact solar collectors, just the safety valve 14 can be used, because in this case the risk of implosion is practically absent, and the vacuum breaker valve 13 would be superfluous.

In this manner, maximum system safety is always guaranteed and, at the same time, the integrity of the plant is preserved because the high temperatures are limited.

Further, owing to the use of these components using an expansion tank in the primary circuit is not necessary because the air cushion that is created inside the circuit acts as an expansion tank. The dilation of the primary fluid due to heating is offset by the compression of the air present inside the primary circuit.

In the specific embodiment, the solar collector 1 comprises a plurality of collector elements, in particular vacuum tubes 2, wherein each vacuum tube 2 has a primary storage element 3 for containing the primary heat transfer fluid apt to store thermal energy and a collector 4 tube, in particular made of glass, which envelops said primary storage element 3, and which is arranged coaxially therewith, forming an insulating air gap.

Said secondary conduit has a plurality of sections 5 connected together in series to form a coil. The sections 5 are arranged in pairs inside said storage elements 3, forming a heat exchange area between the primary heat transfer fluid and the secondary fluid. Preferably, these sections 5 are connected together so as to enter and exit said storage elements 3 from a sole side of the solar collector 1.

Also the storage elements 3 of the primary fluid are connected together by suitable lateral connectors 15 that connect the storage elements 3 two by two, forming said primary conduit. Also in this case they can be connected at a sole side of the solar collector 1, in the specific case the connector side between the sections 5 of the secondary conduit.

Further, the primary conduit is connected to the dissipation conduit 9 by connecting connectors 16. At the side of the solar collector 1 opposite that where the lateral connectors 15 are arranged, the circulator 12 is arranged in fluid connection with said connecting connectors 16 and the safety valve 13 and the vacuum breaker valve 14.

Hydraulic continuity is ensured by the connection circuit 16 between the circulator 12, dissipation conduits 9 and primary conduit 3, 15.

Operationally, the primary heat transfer fluid, contained inside the storage elements 3, is heated owing to the sun's rays hitting the vacuum tube collector 2. Inside the primary storage tube 3 the sections 5 that form the coil of the secondary conduit heat the sanitary water that flows inside the sections 5 at the heat exchange area. Owing to the great insulation that characterizes the aforesaid collector tubes, the temperatures reached by the system, in conditions of appropriate radiation, may be very high, even above 100° C.

Owing to the dissipation conduit 9 and to the radial fins 11, obtained inside the profiles 8, the excess heat is allowed to dissipate to the external environment.

As mentioned previously, the radial fins advantageously ensure thermal continuity between the dissipation circuit and the rest of said containment structure, in particular with the outer surface.

The preferred embodiments have been described above and variants on the present invention have been suggested but it must be understood that expert persons can made modifications and changes without thereby falling outside the relative scope of protection, as defined by the attached claims.

What is claimed is:

1. Compact solar collector (1) comprising a containment structure (6) with at least a face exposed to the solar radiation, said containment structure (6) comprising a central housing recess (7) and an outer frame (8) that encloses and laterally envelops said central housing recess (7), inside said central recess (7) being arranged a primary storage conduit (3, 15) for the storage and the circulation of a primary heat transfer fluid, exposed to the solar radiation, a secondary storage conduit (5) for the circulation and storage of a secondary fluid, and an heat exchange area between said primary (3, 15) and secondary (5) conduits for the heat exchange between the primary heat transfer fluid and the secondary fluid, said solar collector (1) being characterized in comprising a plurality of vacuum sealed collector tubes (2) arranged within said central housing recess (7), wherein each vacuum sealed tube (2) provides a portion (3) of said primary conduit (3, 15) which envelops a respective portion (5) of said secondary conduit (5) in heat exchange between each other, in that in at least a portion of said outer frame (8) of the containment structure (6) is obtained at least a dissipation conduit (9) in fluid communication with said primary conduit (3, 15) for the circulation of said primary heat transfer fluid in order to dissipate the surplus heat outwardly with respect to said solar collector (1), and in further providing a circulator (12) in fluid communication between the primary conduit (3, 15) and the at least dissipation conduit (9), said circulator (12) being apt to set in motion the primary heat transfer fluid when the temperature of the heat transfer fluid exceeds a first pre-set value (T1), in order to allow the primary heat transfer fluid to flow and pass through the at least a dissipation conduit (9) at a higher speed in order to reduce the temperature of the primary heat transfer fluid in order to be re-introduced subsequently in the primary conduit (3, 15).

2. Solar collector (1) according to claim 1, characterized in that said at least a portion of said frame is obtained from a profile (8), made of a thermally conductive material, which has an outer perimeter (10) and a central conduit (9), which coincides with said dissipation conduit, connected in turn to the outer perimeter (10) by means of radial connecting winglets (11) that act as heat transfer fins towards the outside of the solar collector (1).

3. Solar collector (1) according to claim 1, characterized in further providing a thermostat, in connection with said circulator (12) and said primary conduit, said thermostat being able to measure the temperature of the primary heat transfer fluid within said primary conduit and being able to act on said circulator (12) so that, during use, if the temperature of the primary heat transfer fluid exceeds a first pre-set value (T1) said circulator (12) is operated easing the circulation of the primary heat transfer fluid also in the at least a dissipation conduit (9), and if the temperature of the primary conduit drops or goes below a second pre-set temperature value (T2) said circulator (12) is turned off or stays off.

4. Solar collector (1) according to claim 3, characterized in that said first temperature value (T1) varies between 95° C. and 85° C.

5. Solar collector (1) according to claim 3, characterized in that said second temperature value (T2) varies between 80° C. and 70° C.

6. Solar collector (1) according to claim 1, characterized in further providing a non-return and safety valve (14), arranged in fluid connection with said circulator (12) and said primary conduit apt to expel an amount of primary heat transfer fluid for allowing the primary conduit to adjust itself, and in that, during use, if the pressure of the primary conduit exceeds a pressure calibration value (P1) said safety valve (14) expels an amount of fluid until the pressure of the primary conduit stabilizes below said value (P1).

7. Solar collector (1) according to claim 6, characterized in further providing a vacuum breaker valve (13) in combination with said safety valve (14) apt to allow an amount of air to enter in the primary conduit as a function of the pressure difference ($\Delta P$) between the pressure of the environment outside said collector (1) and the pressure in the primary conduit, and in that, during use, if the vacuum breaker valve (13) detects a pressure difference ($\Delta P$), said vacuum breaker valve (13) allows the entry in the primary conduit of an amount of air until such pressure difference ($\Delta P$) is cancelled.

8. Solar collector (1) according to claim 1, characterized in that said portion of the primary circuit (3, 15) is a primary storage element (3) for containing the primary heat transfer fluid apt to store thermal energy and in that each vacuum sealed tube (2) provides a collecting tube (4), which envelops said primary storage element (3), and which is arranged coaxially to it, forming an insulating air gap.

9. Solar collector (1) according to claim 8, characterized in that said secondary conduit has a plurality of sections (5) connected between each other in series forming a coil, wherein the sections (5) are arranged in pairs inside said storage elements (3), forming a heat exchange area between the primary heat transfer fluid and the secondary fluid.

10. Solar collector (1) according to claim 8, characterized in that the storage elements (3) of the primary heat transfer fluid are connected between each other by means of suitable side connectors (15) that connect them two by two, forming said primary conduit.

11. Solar collector (1) according to claim 1, characterized in that the diameter of the dissipation conduit (9) is comprised between 10 mm and 20 mm.

12. Solar collector (1) according to claim 1, characterized in that the circulator (12) is configured so that it acts on the primary heat transfer fluid so that it flows in the dissipation conduit (9) at a speed comprised between 0.5 m/s and 1 m/s.

13. Solar collector (1) according to claim 1, characterized in that the heat exchange between the primary heat transfer fluid and the secondary fluid occurs by natural circulation.

* * * * *